Oct. 19, 1954   W. E. DION ET AL   2,691,889
PLURAL ZONE MEASURING BRIDGE
Filed April 26, 1949
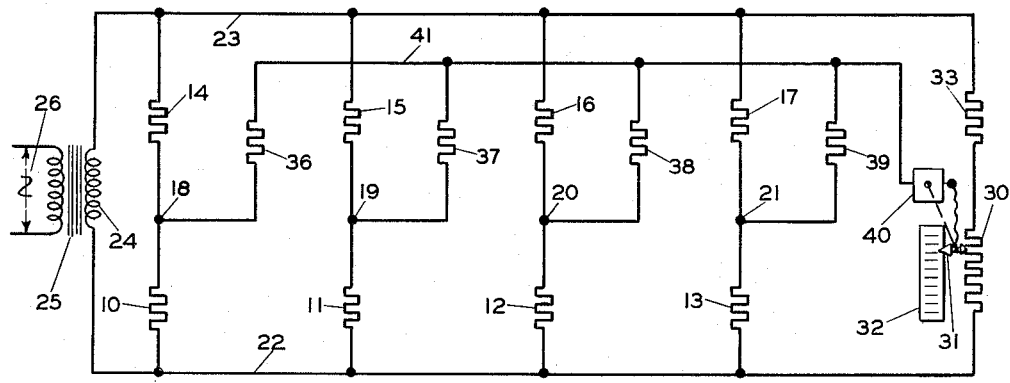
FIG. 1
FIG. 2
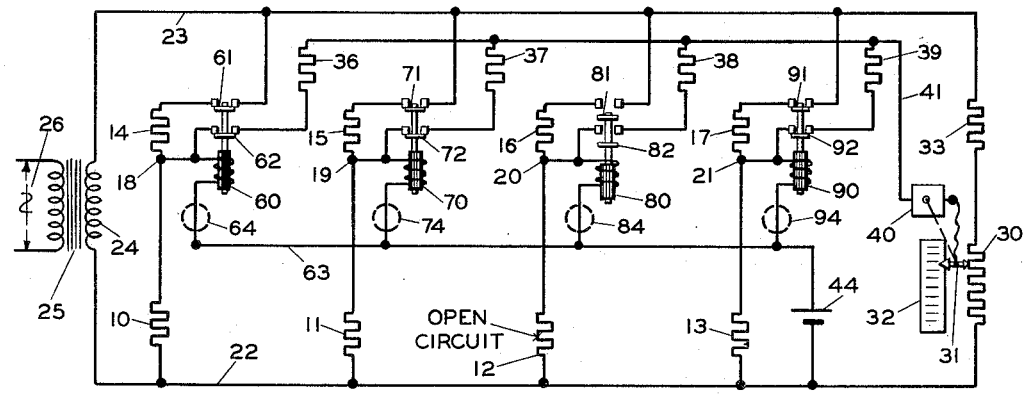
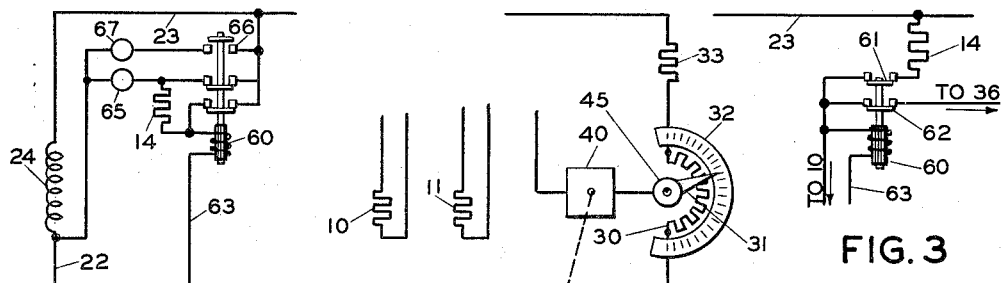
FIG. 4
FIG. 5
FIG. 3
*INVENTORS*
WARREN E. DION
JULES M. DON &
FREDERICK L. MALTBY
BY *George Lynn DeMott*

Patented Oct. 19, 1954

2,691,889

UNITED STATES PATENT OFFICE 2,691,889

PLURAL ZONE MEASURING BRIDGE

Warren E. Dion, Bristol, Jules M. Don, Naugatuck, and Frederick L. Maltby, Middlebury, Conn., assignors to The Bristol Company, Waterbury, Conn., a corporation of Connecticut Application April 26, 1949, Serial No. 89,756

8 Claims. (Cl. 73—342)

This invention relates to electrical bridge networks and particularly to networks arranged to give a continuous response to the average value of a plurality of variable resistance measuring units connected in parallel relation to said network. While the invention is applicable to electrical bridge systems in general, its special utility is found in its application to temperature sensitive resistors, strain gauges, and the like, when it is desired to obtain response which represents the average of two or more similar, though not necessarily equal, magnitudes.

It is known in the prior art to provide a network of the above type for giving a continuous indication of the average value of said units, but when one or more of the units fails, the indication becomes erroneous until the defects are cured. This possibility seriously limits the applications of circuits of this type.

An important object of this invention is, therefore, to provide circuits of the above character with a "fail-safe" feature so as to greatly widen the field of use.

Another object is to provide a system of the above character with automatic means for removing a defective unit from the circuit immediately upon its failure, so that the indications are continuously reliable and accurate.

A further object is found in the provision of means for actuating a signal concurrently with the elimination of a defective unit from the measuring circuit, whereby the existence of the defect may immediately become known.

Still another object of the invention is to provide a bridge network in which the indications are accurate regardless of the number of units which fail, and without attention of an operator.

Numerous other objects and advantages will appear from the following description when it is read in connection with the accompanying drawings in which:

Figure 1 is a circuit diagram of one known type of network to which the present invention is appreciable;

Figure 2 is a diagram, similar to Fig. 1, but showing an embodiment of the present invention applied thereto;

Figure 3 is a detail of a modification of the arrangement shown in Fig. 2;

Figure 4 illustrates the application of the principle of the invention to automatic signalling of abnormal conditions to be detected and eliminated;

Figure 5 shows a modification of the basic circuit of the system with which the invention is associated, to direct control, rather than to measurement, of a variable temperature.

The circuit shown in Fig. 1 represents a bridge network of known type in which an indicating instrument continuously shows the average value of a plurality of parallel-connected variable resistance units, but in which a failure of one of the units will destroy the accuracy of the indications until the defective unit is replaced. As shown, the bridge circuit includes a plurality of condition variable resistance units 10, 11, 12, and 13 each one having connected to it a fixed or standard resistor, the fixed resistors being designated, respectively, 14, 15, 16 and 17. The junction points between the respective resistance units and the respective standard resistors are designated 18, 19, 20 and 21 respectively, in order, as indicated in the drawing.

As many as desired of the fixed and variable resistors are connected in parallel across conductors 22 and 23, four of each being shown by way of illustration. The network is supplied with alternating current from the secondary 24 of a transformer 25 energized from a suitable source 26.

The units 10, 11, 12 and 13 are all identical in characteristics and may be, for example, temperature-sensitive "bulbs" adapted for exposure to temperatures, the values of which are to be averaged. The units may be of any one of numerous types subject to resistance changes in accordance with temperature. For example, wire windings of platinum, nickel, copper, or similar metal having a predetermined temperature coefficient of resistivity may be used, or, alternatively, use may be made of suitable materials in that group of highly temperature-sensitive semiconductors known as "Thermistors."

An adjustable voltage-dividing resistor 30, preferably of the slide-wire type, having a movable contact 31 adapted to cooperate with a graduated scale 32 to provide a measure of the translated position of said contact, is connected in series with a fixed resistor 33 between the conductors 22 and 23. The relative values of the several resistance units in the measuring network are made such that the range of potentials with respect to either of the conductors 22—23 which may be attained by adjustment of the movable contact 31 along the slide-wire 30 will be substantially the same as that of the mean of the potentials of the junction points 18, 19, 20, etc. relative to the same conductor. It will be appreciated that this condition may be fulfilled by a great number of actual and relative values of the several resistance elements; and, since the present invention is directed to the meeting of conditions arising in the event of failure of certain of said elements rather than to the mathematical relationships existing in electrical networks, it will not here be necessary to go into further detail respecting the resistance values of said elements.

Additionally, the network includes a plurality of resistors 36, 37, 38 and 39, each having a high value in comparison with the resistors 10, 11, 12 and 13 (the ratio of values being, for example, of the order of 1,000/1) and said high-value resistors having each a terminal connected to the junction points 18, 19, 20 and 21.

An alternating-current detector-servomotor unit 40, provided with two input terminals, is arranged to translate the movable contact 31 with respect to the resistor 30 and in accordance with the degree and sense of potential impressed between said terminals. One of said terminals is connected to a conductor 41, which in turn is common to the free end of the resistors 36, 37, etc., and the other of said terminals is flexibly connected to the movable contact 31. Means for thus automatically producing a balance is known, and is, for example, fully set forth in U. S. Letters Patent No. 1,586,233, granted to Anschutz-Kaempfe May 25, 1926, and need not here be more fully described.

The combination as thus far set forth comprises an alternating-current bridge network wherein adjustment of the sliding contact 31 with respect to the resistor 30 may be utilized to produce a balanced condition. Assuming for the moment the circuits through the resistors 37, 38 and 39 to be interrupted, only that through the unit 36 remaining complete, the position attained by the contact 31, corresponding to a null condition in the detector 40, and as indicated on the scale 32 will be a function of the resistance value of the unit 10, the resistance of the unit 36 not entering directly into the computation, but only affecting the sensitivity of the detector 40. Similarly, if any other one of the resistors 36, 37, etc. have a circuit completed through it alone, the position of the movable contact 31 with respect to the scale 32, will be a measure to that one of the several temperature-sensitive resistors which is in the same branch of the circuit as the complete one of the high-value units.

According to well-known principles of electrical networks, it may be shown that when no current is passing through the detector 40, the potential attained by the conductor 41 with respect to the conductors 22 and 23 will represent substantially the mean of the potentials of the several junction points 18, 19, 20 and 21 to which the high resistors 36, 37, 38 and 39, respectively, are connected. Obviously the computation necessary to the desired indication will include not only the value of each individual variable resistor, but also the number of units in the system where the average is to be determined. Therefore, if the resistors 14, 15, 16 and 17 are equal in value, the potential of the conductor 41 will bear a direct relationship to the average value of the resistance units 10, 11, 12 and 13. It follows that, if the position of the slider 31 along the calibrated resistance unit 32 be adjusted until current through the detector 40 is reduced to zero, this position, as determined by the graduations of the scale 32 will be proportional to the average value of said units 10, 11, 12 and 13.

The circuit just described has been illustrated to explain the basic principles of the present invention. From this it is clear that failure of one or more of the units 10, 11, 12 or 13 will cause the slider 31 to give an erroneous indication, which, since failures of this sort are not uncommon, would seriously limit the usefulness and dependability of this method of measurement. By reference to Fig. 2 it will be evident how the shortcomings of the prior art circuit have been overcome, and continuously effective automatic means provided for removing a defective unit from the circuit, and insuring at all times an accurate indication of the average value of the units in the circuit.

Referring now to Fig. 2, the reference characters used correspond to those of Fig. 1 where the parts correspond. As pointed out above, the known system shown in Fig. 1 offers the serious disadvantage that a failure of any one of the units 10, 11, 12, or 13, producing an open circuit, destroys the accuracy of the indication given at 32, and makes necessary manual replacement of the defective unit before accurate indications can be obtained. The scheme shown in Fig. 2 comprises automatic means in the form of a direct current relay associated with each of the units for restoring the system to accurate operating condition whenever one or more of the units fails.

Considering first the unit 10 with its standard resistor 14. This unit has associated with it a direct current relay 60 having an actuating coil connected between the junction point 18 and a source of direct current 44 which is included in the circuit with the unit 10, and is also connected between conductor 22 and a conductor 63 which forms a common terminal for each of the relays associated with the several variable resistance units. The relay 60 has two sets of contacts. The one set 61, when closed, completes the circuit between conductor 23 and the resistor 14. Similarly, a set of contacts 62 acts to connect the resistor 36 in circuit with the junction point 18. It will be seen that when the relay is deenergized both of the contacts 61 and 62 are open, thus disconnecting the variable resistor 10 and the fixed resistor 14 from the circuit and likewise from the resistor 36. Thus the relay 60 by its deenergization completely removes the resistors 10, 14 and 36 from the network.

Associated with resistors 15, 16 and 17 are relays 70, 80 and 90 similar to the relay 60, and each having two sets of contacts similar to those of relay 60 and disposed in a similar manner. It will be seen that during normal operation of the network shown in Fig. 2 the relays 60, 70, 80 and 90 are all energized to hold their contacts closed and to make the circuit effective as it is shown in Fig. 1. The various relay coils are under these conditions held closed by direct current received from the battery 44 which supplies the various relay coils in parallel. It should be pointed out that the A.—C. impedance of each of the operating coils of the various relays is made very high in relation to the individual resistances of the variable resistance units 10, 11, 12 and 13 for a purpose presently to be set forth.

The operation of the circuit shown in Fig. 2 is as follows: With the units 10, 11, 12 and 13 in operative condition, and with the relays energized from source 44, the circuit shown in Fig. 2 will appear as in Fig. 1, and its operation to provide on scale 32 a measure of the average of the instantaneous values of the units 10, 11, 12 and 13 will be as described in connection with Fig. 1. It will be observed that, so far as concerns the flow of direct current, the windings of the several relays 60, 70, 80 and 90 are in series with the variable resistors 10, 11, 12 and 13 respectively across the direct-current source 44. Since each direct-current loop is thus complete in itself, there will be no tendency for unidirectional current to flow in the measuring network; and thus, such direct current as may flow in the variable resistors will have no effect upon the ultimate measurement. So far as concerns the flow of alternating current, it will be seen that each of the variable resistors 10, 11, 12 etc. in series with its associated standard resistor 14, 15, 16, etc. forms a branch across the alternating-current source, these several branches of course being mutually in parallel. The winding of each relay, in series with the direct-current source 44, provides a shunt across the corresponding variable resistance unit; and, if the flow of alternating current through the relay winding were of appreciable magnitude as compared with that through the variable resistor, the accuracy of measurement would be affected. The relay windings, however, are made of high impedance with relation to the several variable resistance units (of the order of 1,000/1) so that such error as may be introduced by the flow of alternating current through the relay windings will be of negligible proportions. Therefore, so far as involves the element of accuracy, the presence of the relays in the circuit of Fig. 2 does not appreciably modify the performance of the basic circuit of Fig. 1, but it does provide the features which form the subject matter of the present invention.

It will now be assumed by way of example that one of the resistance units, for example unit 12, becomes open circuited. The main direct-current path for the relay 80 is, therefore, interrupted, and such current as may flow through the two parallel paths provided by the resistor 16 and the secondary winding 24 of transformer 25 on the one hand, and the resistor 38 in series with the detector 40 and a portion of the adjustable resistor 30 on the other hand, will be so small as not to hold the relay 80 energized. Thus the open circuiting of the resistance unit 12 will cause de-energization of relay 80, opening its contacts 81 and 82 (which are respectively connected to the associated conductors and resistors in a manner identical with the corresponding contacts 61 and 62 of relay 60) and thereby disconnecting the defective resistance unit 12 and its associated resistor 16 from the network. Consequently, the slider 31 will be adjusted to indicate the average value of the remaining resistance units 10, 11 and 13, and without regard to the failure of resistor 12. When the defective resistor unit 12 is replaced, the slider 31 will again assume a position which is an indication of the average resistance value of all four of the units 10, 11, 12 and 13.

It is to be understood that the application of the invention is not limited to four units, as indicated, nor is it affected by failure of one only of these units. Consequently, the action would be the same if two or three of the units should fail simultaneously because the defective units would be removed from the circuit by deenergization of their individual relays, and the slider 31 would be readjusted so as to indicate the average resistance value of the units remaining in the circuit. It may further be pointed out that, while the several variable resistors whose average value it is desired to measure have been considered as being located at more or less separate points, the invention is not so limited. In some instances where it is extremely important that a dependable measure be obtained of the resistance in one location it is an accepted practice to place several more or less distinct temperature sensitive units at that point, connecting them as indicated. Thus, with all these units in service, the mean of their several resistances will represent the temperature at the selected location, while, if one or more of the elements should fail, the circuit will be automatically modified so that a reading will continue to be obtained of the average of the remaining elements, thus maintaining a measure of the desired temperature value with little loss of precision.

The circuit shown in Fig. 2 is subject to modification for the purpose of simplifying the internal connections, by making the changes which are indicated simply in Fig. 3. In that figure, one only of the relays is shown, with the understanding that the other relays may be connected similarly. For example, in Fig. 3 the standard resistor 14 is connected directly to the conductor 23 and the relay contacts 61 serve in turn to connect the resistor 14 with the resistor 10. The contacts 62 are arranged as before. This modification has no effect upon the measuring properties of the network, but it does make possible a direct connection between one of the contacts 61 and one of the contacts 62, thus simplifying the utilization of the relay in a circuit of the type under consideration.

While the present invention as thus far described is effective to remove a defective resistance element from the measuring circuit without disturbing the accuracy of indication of the mean value of those elements remaining in operative condition, it is desirable that the condition responsible for the functioning of the apparatus be immediately made known, so that the fault may be rectified at the earliest opportunity. In order to effect such a result, it is expedient to provide the system with some form of signal which will become operative upon the development of an abnormal condition, thus notifying those in charge that said condition exists. One manner in which such a result may be obtained is by the use of lamps 64, 74, 84 and 94 (shown dotted in Fig. 2) connected in series with the respective relay coils 60, 70, 80 and 90. Each of these lamps will glow when its associated relay is energized, denoting normal conditions in the corresponding branch of the network; and de-energization of a relay will be indicated by the associated lamp being extinguished, signifying a faulty resistance unit in that part of the circuit.

In Fig. 4 is shown a further method by which signals may be operated to indicate the failure of resistance elements in the measuring network. The method involves the use of two signals, here shown as lamps 66 and 67, one of which is energized when the relay is energized, and the other of which is de-energized when the relay is de-energized. The arrangement is shown in combination with the relay 60, but it will be obvious that similar signal lamps can be installed in combination with any or all of the other relays in the system. Lamp 65 has its respective terminals connected, one to that element of the relay contact 61 which is normally connected to the standard resistance unit 14, and the other to the conductor 22, which forms one side of the alternating current supply to the network. When the relay 60 is energized and the contacts 61 closed the terminals of the signal lamp 65 will be at the potentials of the conductors 22 and 23 respectively, thereby causing the full voltage of the secondary winding 24 to be applied to the lamp. If the relay 60 becomes de-energized the line voltage will no longer be applied to the terminals of the lamp, and the combined resistance of the relay 60 and the resistor 14 will be so high as to prevent appreciable energization of the lamp from the direct-current source 44. The lamp 65 will thus provide an effective signal as to whether the relay 60 is or is not energized, and therefore of the condition of the variable resistor 10.

As shown, the relay 60 may be provided with a set of normally closed contacts 66 adapted to be open when the relay is energized. A signal lamp 67 is connected in series with the contacts 66 between the conductors 22 and 23. Thus so long as the relay 60 is energized, maintaining the contacts 66 in an open condition, the signal lamp 67 will remain extinguished, and upon de-energization of the relay 60 the contacts 66 will be closed, causing the secondary voltage of the transformer 25 to be impressed upon the terminals of the lamp, thereby illuminating the same to signify a faulty condition of the variable resistor 10.

Thus, as illustrated, one or the other of the signals is always energized regardless of the condition of the associated relay. The lamps 65 and 67 may be distinguished from each other by color. If a double indication is not desired either of the lamps 65 or 67 may be omitted, and when lamp 67 is omitted the contacts 66 may be omitted from the relay.

While the signal means has been set forth as comprising a lamp, it will be obvious that such a visual indicator may be supplemented by, or have substituted therefore, a bell or other audible signal, may be replaced by, or combined with any one or more of numerous signalling devices known to the art.

The invention has been set forth in its application to apparatus for obtaining a quantitative measurement representing the mean of several independently determined temperatures, either at discrete locations or at a common point. It will be understood by those versed in the art that the principles of the apparatus may be applied to regulation of said temperature values by the utilization of control instrumentalities directly subject to the motions imparted to the movable contact 31, there being many such devices available from the prior art. It will be further understood that the system is also applicable to direct control without intermediate exhibition of the temperature values under regulation. Such a control system is shown in part in Fig. 5, wherein are illustrated certain elements appearing in the previous disclosure together with further elements whereby the control function may be directly carried out. The standard resistor 33 and the adjustable resistor 30 are shown in their normal relationship; but, instead of the movable contact 31 associated with the latter being subject to positioning by means of a servomotor, it takes the form of a manually adjustable member provided with a conveniently manipulated knob 45. The detector element 40, instead of serving to translate the contact 31 relatively to the resistor 30, is caused to actuate a valve 46 or the like, controlling the admission of fuel or other temperature affecting agent to a burner or the like 47, to whose influence are subjected the temperature-sensitive resistors 10, 11, etc. of the measuring network.

It will be seen that, according to principles hereinbefore set forth, any condition of unbalance in the electrical measuring network, as represented by a difference in potential between the terminals of the detector 40, and indicating a divergence of the mean temperature of the sensitive resistance units, from that corresponding to the predetermined setting of the contact 31 on the slide-wire 30, will cause said detector to provide a definite response. By suitably selecting, proportioning, and arranging the mechanical connection between the detector 40 and the valve or equivalent 46, said response may be utilized to adjust the latter in a sense to minimize, and eventually eliminate, said temperature divergence, thereby tending to regulate the mean temperature to the value whereat the contact 31 is set on the slide-wire 30 and as indicated on the graduated scale 32. While the direct control system as thus described does not differ patentably from that in which the regulating member is moved by the deflections of a measuring instrument, it will be seen that the importance of having a true mean of temperature measurement is as important as in the former instance, and that the function of the invention is as applicable to one form of automatic temperature control as to the other.

While in the above description it has been indicated that four variable resistance units are employed, it will be obvious that the invention is by no means limited to this particular number and that the number may be more or less dependent upon conditions encountered. It is to be understood, likewise, that the system is applicable not only to self-balancing systems, which are preferred, but also to those requiring a manual adjustment for balancing purposes. Obviously, the greatest use will be found for systems of the automatic type since with this type the services of an operator are required only when a unit fails or a reading of the scale 32 is to be taken or checked.

Having thus described our invention, what is claimed is:

1. An electrical bridge network comprising a plurality of bridge branches connected in parallel relation across a source of electrical current, one of said branches being common to all of the bridges in said network, and each of the other branches being a series circuit having, in series relation therein, a condition variable impedance unit, a second impedance unit and normally closed switch means movable to open circuit position, a cross-arm extending from said common branch to each of the other branches, said cross-arm being connected to each of the other branches between the condition variable impedance unit and the second impedance unit thereof, and means responsive to an open circuit in any one of said condition variable impedance units to move the switch means located in the branch in which the open circuit occurs to open circuit position also whereby the entire branch is removed from the network, means responsive to electrical current flowing in said cross-arm to indicate a condition measured by said variable impedance units.

2. An electrical bridge network comprising a plurality of bridge branches connected in parallel relation across a source of electrical current, one of said branches being common to all of the bridges in said network and each of the other branches being a series circuit having, in series relation therein, a condition variable impedance unit, a second impedance unit and normally closed switch means movable to open circuit position, a cross-arm extending from said common branch through another normally closed switch means to each of said other branches and being connected to each of the other branches between the condition variable impedance unit and the second impedance unit thereof, said last-named normally closed switch means also being movable to open circuit position, and means responsive to an open circuit condition in any one of said condition variable impedance units to move both the switch means located in the branch in which the open circuit occurs and the switch means located in the cross-arm associated with said branch to open circuit position also whereby the entire branch is removed from the network, means responsive to electrical current flowing in said cross-arm to indicate a condition measured by said variable impedance units.

3. An electrical bridge network according to claim 2, including signal means operable upon removal of a branch from the network to indicate that the branch has been removed from the network.

4. An electrical bridge network comprising a plurality of bridge branches connected in parallel relation across a source of electrical current, one of said branches being common to all of the bridges in said network and each of the other branches being a series circuit having, in series relation therein, a condition variable impedance unit, a second impedance unit and a normally closed contact member movable to open circuit position, a cross arm extending from said common branch through another normally closed contact member associated with each of the other branches to each of the other branches and being connected thereto between the condition variable impedance unit and the second impedance unit thereof, each of said last-named contact members being movable to open circuit position, and a relay associated with each of said other branches, said relay, when energized, maintaining both the contact member located in the branch with which it is associated and the contact member located in the cross arm associated with said branch in closed circuit position, and means to de-energize said relay when the condition variable impedance unit of said associated branch becomes open circuited whereby both contact members move to open circuit position to remove said associated branch from the network, means responsive to electrical current flowing in said cross-arm to indicate a condition measured by said variable impedance units.

5. An electrical bridge network comprising a plurality of bridge branches connected in parallel relation across a source of electrical current, one of said branches being common to all of the bridges in said network and including an adjustable resistance unit, each of the other branches being a series circuit having, in series relation therein, a condition sensitive resistance unit, a standard resistance unit and normally closed switch means movable to open circuit position, a cross-arm connected to and extending from the adjustable resistance unit of said common branch to each of said other branches, said cross-arm having therein means to adjust said adjustable resistance unit in response to current flowing in the cross-arm to thereby balance said bridge network, the adjustment of said adjustable resistance unit being indicative of the condition measured by said condition variable resistance units, said cross-arm being connected to each of said other branches between the condition sensitive resistance unit and a standard resistance unit thereof, and relay means associated with each of said other branches and responsive to an open circuit condition in the condition sensitive resistance unit located in the branch with which the relay means is associated to move the switch means located in that branch to open circuit position also whereby the entire branch is removed from the network.

6. An electrical bridge network comprising a plurality of bridge branches connected in parallel relation across a source of electrical current, one of said branches being common to all of the bridges in said network and including an adjustable resistance unit, each of the other branches being a series circuit having, in series relation therein, a condition variable resistance unit, a standard resistance unit and a set of normally closed relay contacts, a cross-arm connected to and extending from the adjustable resistance unit of said common branch to each of said other branches, said cross-arm having therein means to adjust said adjustable resistance unit in response to current flowing in the cross-arm to thereby balance said bridge network, the adjustment of said adjustable resistance unit being indicative of the condition measured by said condition variable resistance units, said cross-arm being connected to each of said other branches between the condition variable resistance unit and the standard resistance unit thereof, a relay coil associated with each of said other branches, said relay coil being in closed circuit relation with the condition variable resistance unit of the branch with which it is associated, and means to cause electrical current to flow in a series path through said relay coil and said associated condition variable resistance unit to energize said coil, said coil, when energized, maintaining the set of relay contacts in the branch with which it is associated closed and, when de-energized, causing said set of contacts to open whereby an open circuit condition in the condition variable resistance unit of the branch with which said relay coil is associated causes the relay coil to become de-energized and thereby open the associated set of relay contacts to remove the affected branch from the network.

7. An electrical bridge network comprising a plurality of bridge branches connected in parallel relation across a source of electrical current, one of said branches being common to all of the bridges in said network and including an adjustable resistance unit, each of the other branches being a series circuit having, in series relation therein, a condition variable resistance unit, a standard resistance unit and a first set of normally closed relay contacts, a cross-arm connected to and extending from the adjustable resistance unit of said common branch through a second set of normally closed relay contacts associated with each of said other branches to each of said other branches, said cross-arm having therein means to adjust said adjustable resistance unit in response to current flowing in the cross-arm to thereby balance said bridge network, the adjustment of said adjustable resistance unit being indicative of the condition measured by said condition variable resistance units, said cross-arm being connected to each of said other branches between the condition variable resistance unit and the standard resistance unit thereof, a relay coil associated with each of said other branches, said relay coil being in closed circuit relation with the condition variable resistance unit of the branch with which it is associated, and means to cause electrical current to flow in a series path through said relay coil and said associated condition variable resistance unit to energize said coil, said coil, when energized, maintaining both the first set of relay contacts in the branch with which it is associated and the second set of relay contacts in the cross-arm connected to said branch closed and, when de-energized, causing said sets of contacts to open whereby an open circuit condition in the condition variable resistance unit of the branch with which said relay coil is associated causes the relay coil to become de-energized and thereby open both associated sets of relay contacts to remove the affected branch from the network.

8. An electrical bridge network as defined in claim 6, in which said plurality of bridge branches are connected in parallel across a source of alternating current electricity, and each of said relay coils is connected in closed circuit relation with the condition variable resistance unit of the branch with which it is associated and a source of direct current electricity.

References Cited in the file of this patent

UNITED STATES PATENTS

| Number | Name | Date |
|---|---|---|
| 1,642,525 | Wheeler | Sept. 13, 1927 |
| 2,340,605 | MacLaren | Feb. 1, 1944 |
| 2,456,499 | Fritzinger | Dec. 14, 1948 |